(12) United States Patent
Hayashi

(10) Patent No.: US 10,017,148 B2
(45) Date of Patent: Jul. 10, 2018

(54) SIDE AIRBAG DEVICE FOR A VEHICLE AND SIDE AIRBAG FOLDING METHOD

(71) Applicant: Toyota Jidosha Kabushiki Kaisha, Toyota-shi Aichi-ken (JP)

(72) Inventor: Shigeki Hayashi, Kasugai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 18 days.

(21) Appl. No.: 15/252,614

(22) Filed: Aug. 31, 2016

(65) Prior Publication Data

US 2017/0113645 A1  Apr. 27, 2017

(30) Foreign Application Priority Data

Oct. 26, 2015 (JP) .................................. 2015-210195

(51) Int. Cl.
| | |
|---|---|
| *B60R 21/237* | (2006.01) |
| *B60R 21/207* | (2006.01) |
| *B60R 21/231* | (2011.01) |

(52) U.S. Cl.
CPC .......... *B60R 21/237* (2013.01); *B60R 21/207* (2013.01); *B60R 2021/23146* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,906,395 A | * | 5/1999 | Isaji ...................... | B60R 21/207 280/728.2 |
| 9,238,446 B2 | * | 1/2016 | Azuma ................. | B60R 21/237 |
| 2010/0052300 A1 | * | 3/2010 | Sugimoto ......... | B60R 21/23138 280/743.1 |
| 2010/0295277 A1 | * | 11/2010 | Ochiai .............. | B60R 21/23138 280/729 |
| 2013/0076013 A1 | * | 3/2013 | Shibayama ........... | B60R 21/263 280/742 |
| 2013/0234421 A1 | * | 9/2013 | Honda .............. | B60R 21/23138 280/729 |
| 2014/0091562 A1 | | 4/2014 | Sugimoto | |

(Continued)

FOREIGN PATENT DOCUMENTS

| | | | | |
|---|---|---|---|---|
| JP | 2002-211338 A | | 7/2002 | |
| JP | 2008132945 A | * | 6/2008 | ........... B60R 21/207 |

(Continued)

*Primary Examiner* — Nicole T Verley
(74) *Attorney, Agent, or Firm* — Dinsmore & Shohl LLP

(57) ABSTRACT

A side airbag device, for a vehicle, includes: a folded portion housed in a side portion located at a vehicle front side of a rear end of the side airbag, the folded portion having a plurality of crease portions and portions to the front and rear of the folds at the plurality of crease portions being superimposed in the vehicle transverse direction, and a portion in which first and second crease portions, counting from a rear end portion side of the side airbag, are outwards folds that are folded towards the outer side in the vehicle transverse direction, and in which crease portions including and subsequent to a third crease portion, counting from the rear end portion side, that are also located at the vehicle front side of the folded portion, are inwards folds that are folded towards an inner side in the vehicle transverse direction.

5 Claims, 12 Drawing Sheets

(56) References Cited

U.S. PATENT DOCUMENTS

| | | | | |
|---|---|---|---|---|
| 2014/0300089 A1* | 10/2014 | Azuma | ................ | B60R 21/237 |
| | | | | 280/730.2 |
| 2015/0183393 A1* | 7/2015 | Kino | .................... | B60R 21/207 |
| | | | | 280/729 |
| 2015/0367806 A1 | 12/2015 | Fujiwara | | |
| 2017/0151923 A1* | 6/2017 | Goto | .................... | B60R 21/207 |
| 2017/0158160 A1* | 6/2017 | Sugimori | .............. | B60R 21/207 |

FOREIGN PATENT DOCUMENTS

| | | | | | |
|---|---|---|---|---|---|
| JP | 2008195355 A | * | 8/2008 | ........... | B60R 21/237 |
| JP | 2012-136155 A | | 7/2012 | | |
| JP | 2012197048 A | * | 10/2012 | ........... | B60R 21/231 |
| JP | 2012-250583 A | | 12/2012 | | |
| JP | 2013091421 A | * | 5/2013 | ........... | B60R 21/237 |
| JP | 2014-141159 A | | 8/2014 | | |
| JP | 2014-237411 A | | 12/2014 | | |
| WO | WO-2012165202 A1 | * | 12/2012 | ........... | B60R 21/231 |
| WO | WO-2016027616 A1 | * | 2/2016 | ............ | B60R 21/237 |

\* cited by examiner

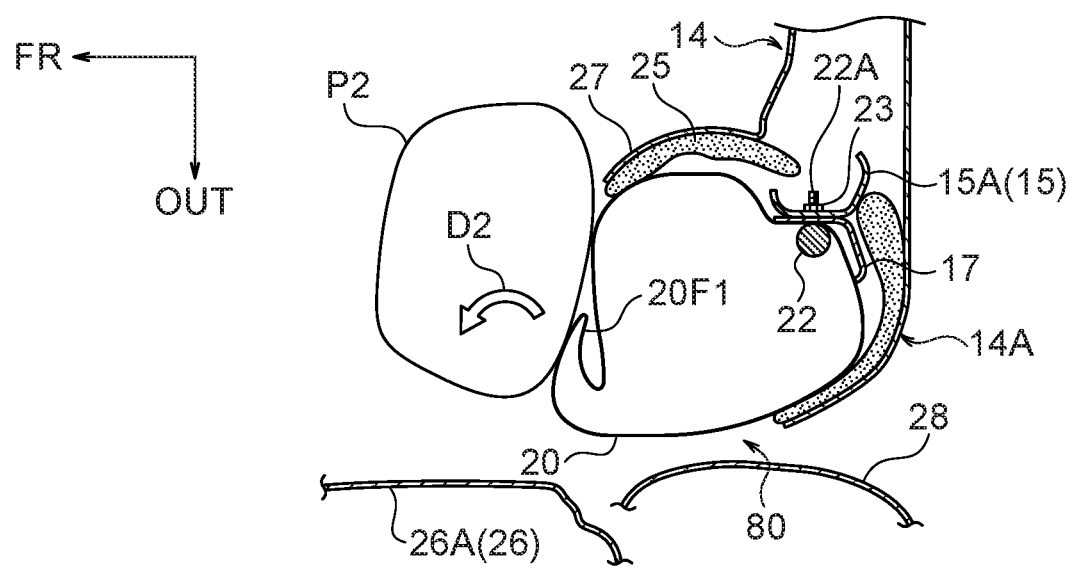

SIDE AIRBAG DEVICE FOR A VEHICLE AND SIDE AIRBAG FOLDING METHOD

CROSS-REFERENCE TO RELATED APPLICATION

This application is based on and claims priority under 35 USC 119 from Japanese Patent Application No. 2015-210195 filed on Oct. 26, 2015, the disclosure of which is incorporated by reference herein in its entirety.

BACKGROUND

Technical Field

The present disclosure relates to a side airbag device for a vehicle and to a method of folding a side airbag.

Related Art

In a side airbag device described in Japanese Patent Application Laid-Open (JP-A) No. 2014-237411, an airbag is housed in a folded state inside a side support on a vehicle outer side of a seat back of a vehicle seat. This airbag is deployed and inflated between a seated vehicle occupant and side wall portions of the vehicle by inflator gas from an inflator.

In a folded state, a folded portion at a distal end (i.e., a front end and an upper end) in the deployment direction of this airbag is folded back towards the vehicle inner side. This distal end folded portion is inflated at the same time as this state of being folded back towards the vehicle inner side is released (i.e., as the airbag is deployed). During this deployment and inflation, the aforementioned distal end folded portion is deployed from the vehicle inner side towards the vehicle outer side. As a result, the distal end folded portion can be smoothly deployed without coming into contact with the side wall portions of the vehicle.

However, in a side airbag device having the above-described structure, when the folded portion at the distal end of the airbag is inflated at the same time as it is deployed from the vehicle inner side towards the vehicle outer side, the direction in which this distal end folded portion is deployed faces towards the vehicle front side. Because of this, if the airbag is inflated and deployed while the vehicle occupant is positioned in an incorrect position on the vehicle forward side of the side support portion, then there is a possibility that the vehicle occupant who is in this incorrect position will receive a load from the distal end folded portion that is deployed towards the vehicle front side. Accordingly, there is room for improvement from the standpoint of improving the performance when protecting a vehicle occupant in an incorrect position (known as the OOP (out of position) performance).

SUMMARY

In consideration of the above-described circumstances, it is an object of the present disclosure to provide a side airbag device for a vehicle and a method of folding a side airbag that make improvements to both the side airbag deployment performance and the OOP performance.

A side airbag device for a vehicle according to a first aspect of the present disclosure includes: a side airbag that is housed in a side portion on an outer side in a vehicle transverse direction of a seat back of a vehicle seat, that receives a gas supply from an inflator that is housed in a rear end portion of the side airbag, and that is then inflated and deployed between a seated vehicle occupant and a vehicle body side portion, wherein the side airbag includes: a folded portion, of the side airbag that is housed in the side portion, that is located at a vehicle front side of a rear end of the side airbag, the folded portion having a plurality of crease portions that extend in an up-down direction of the side airbag, and portions to the front and rear of the folds at the plurality of crease portions being superimposed in the vehicle transverse direction, and a portion in which first and second crease portions, counting from a rear end portion side of the side airbag, are outwards folds that are folded towards the outer side in the vehicle transverse direction, and in which crease portions including and subsequent to a third crease portion, counting from the rear end portion side, that are also located at the vehicle front side of the folded portion, are inwards folds that are folded towards an inner side in the vehicle transverse direction, in which at least one crease portion is located further to a front end portion side of the side airbag than an initial inward folding crease portion counting from the rear end portion side, the initial inward folding crease portion being positioned on the outer side in the vehicle transverse direction of the first crease portion.

In the side airbag device for a vehicle according to the first aspect of the present disclosure, a side airbag having a folded portion that is folded in the above-described manner is inflated and deployed by receiving a gas supply from an inflator that is housed in a rear end portion of this side airbag. During this inflation and deployment, the folds at the above-described plurality of crease portions are eliminated in sequence starting from the first crease portion counting from the rear end portion side of the airbag, and the side airbag is inflated and deployed sequentially from the rear end portion side towards the front end portion side. Here, the first crease portion and the second crease portion counting from the rear end portion side of the side airbag are outwards folds that are folded towards the outer side in the vehicle transverse direction. Because of this, in the initial stages of the deployment of the side airbag when the folds formed at the first crease portion and the second crease portion are eliminated, the side airbag deploys towards the outer side in the vehicle transverse direction. As a result, even if the side airbag is inflated and deployed while a vehicle occupant is located in an incorrect position on the vehicle forward side of the side support portion, it is possible to either prevent the vehicle occupant who is in this incorrect position from receiving a load from the side airbag, or to limit any load that might be received.

The above-described folding portion also includes a portion in which crease portions including and subsequent to a third crease portion counting from the rear end portion side of the side airbag that are also located on the vehicle front side of the folded portion are inwards folds that are folded towards the inner side in the vehicle transverse direction. In addition, an initial inward folding crease portion counting from the rear end portion side of the side airbag (hereinafter, this will be abbreviated simply to the 'initial inward folding crease portion') is located on the outer side in the vehicle transverse direction of the above-described first crease portion. Because of this, in the final stages of the deployment of the side airbag when the fold of the initial inward folding portion is eliminated, the portion of the side airbag that is located on the front end portion side of the initial inward folding portion is deployed by spinning around the initial inward folding portion from the inner side in the vehicle transverse direction towards the outer side in the vehicle transverse direction. As a result, it is possible to prevent the side airbag in the final stages of deployment from becoming caught on vehicle body side portions, or to limit this if it does happen. Thereafter, the front end portion side of the side airbag is deployed towards the vehicle front side on the outer side in the vehicle transverse direction of the vehicle occupant who is in an incorrect position. As a result of the above, according to the first aspect of the present disclosure, it is possible to make improvements to both the deployment performance and the OOP performance of the side airbag.

A side airbag device for a vehicle according to a second aspect of the present disclosure is characterized in that, in the first aspect, the side airbag is configured to restrain from a shoulder portion to a waist portion of the seated vehicle occupant, and a bottom portion side of the folded portion is folded in a Z-fold towards the outer side in the vehicle transverse direction.

In the side airbag device for a vehicle according to the second aspect of the present disclosure, the bottom portion side of the folded portion that is folded at the plurality of crease portions that extend in the up-down direction is folded towards the outer side in the vehicle transverse direction in a Z-fold (i.e., an outside three-fold). As a result, it is possible to shorten the dimensions in the up-down direction of the side airbag when it is in a folded state. Moreover, because a Z-fold provides an excellent deployment performance, the bottom portion side of the side airbag can be deployed superbly in the narrow space between the waist portion of the seated vehicle occupant and the vehicle body side portion.

A side airbag folding method according to a third aspect of the present disclosure includes: a front two-folding step in which a front two-fold portion is formed by folding a front portion of a side airbag back towards one side in a thickness direction of the side airbag along a first fold line that extends in an up-down direction of the side airbag; a four-folding step in which a wrapped four-fold portion is formed by folding the front two-fold portion in two along a second fold line that extends in the up-down direction; a rear two-folding step in which a rear two-fold portion is formed by folding a rear portion of the side airbag back towards the other side in the thickness direction of the side airbag along a third fold line that extends in the up-down direction; and a superimposition step in which the wrapped four-fold portion is superimposed onto the rear two-fold portion on an opposite side thereof from the rear portion by folding the side airbag in two along a fourth fold line that extends in the up-down direction.

In the side airbag folding method according to the third aspect of the present disclosure, the side airbag is folded via the each of the above-described steps. As a result, a side airbag that is folded so as to fulfill an aspect of the airbag according to the first aspect can be manufactured with ease.

A side airbag folding method according to a fourth aspect of the present disclosure is characterized in that, in the third aspect, further includes a Z-folding step in which, while the wrapped four-fold portion is located on one side relative to the rear portion, a bottom portion side of the side airbag that is formed after the superimposition step is folded in a Z-fold towards the one side along an upper and lower pair of bottom side fold lines.

In the side airbag folding method according to the fourth aspect of the present invention, the bottom portion side of the side airbag after the superimposition step has been performed is folded in accordance with the above-described Z-folding step. As a result, a side airbag that is folded so as to fulfill an aspect of the airbag according to the second aspect can be manufactured with ease.

As has been described above, in the side airbag device for a vehicle and method of folding a side airbag according to the present disclosure, improvements are made to both the side airbag deployment performance and the OOP performance.

BRIEF DESCRIPTION OF THE DRAWINGS

An exemplary embodiment of the present disclosure will be described in detail based on the following figures, wherein:

FIG. 6C is a planar cross-sectional view corresponding to FIG. 5C showing a final deployment state of the side airbag according to the first comparative example;

DETAILED DESCRIPTION

Figure 1:
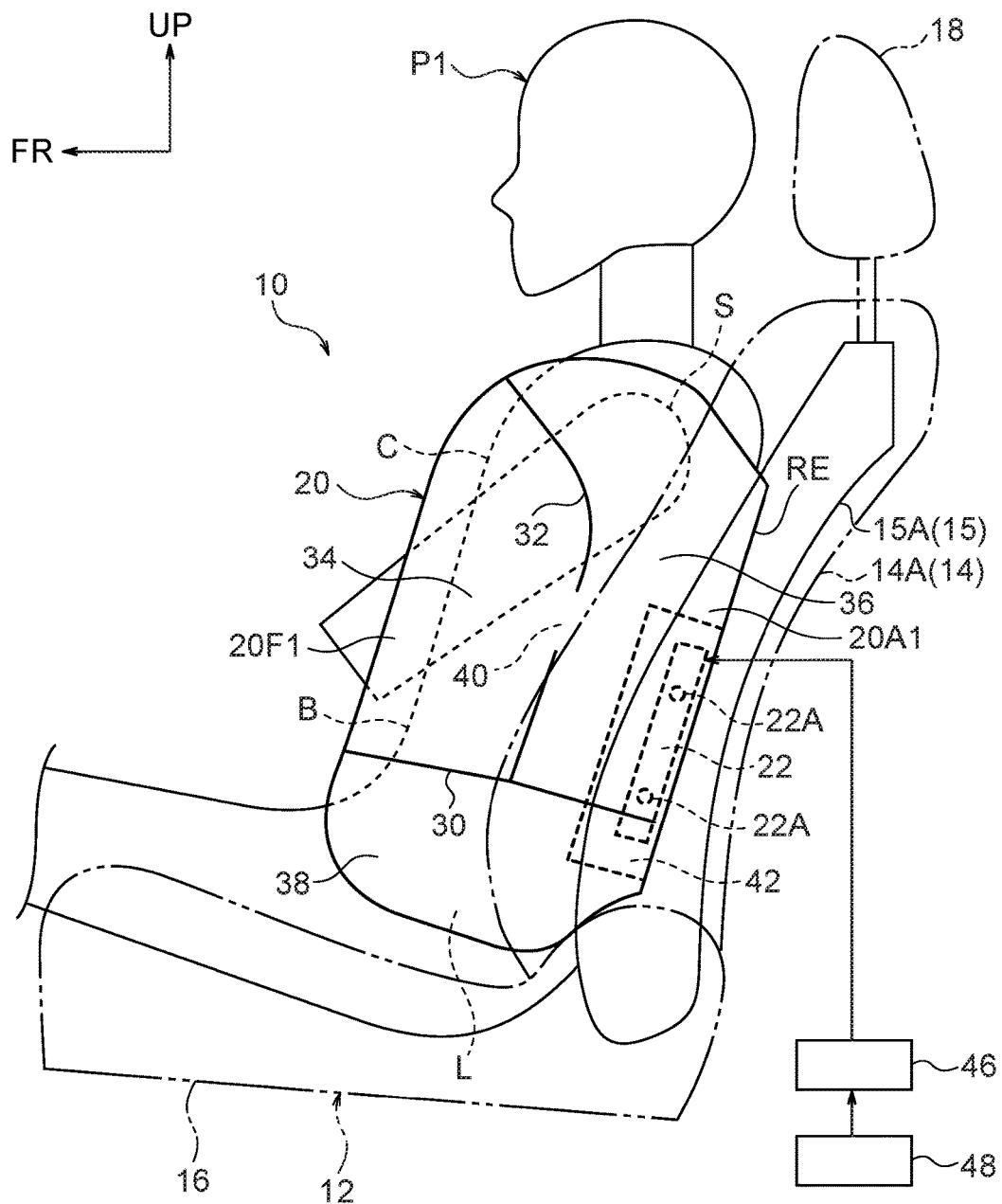
FIG. 1 is a side view showing a vehicle seat in which a side airbag device for a vehicle according to an embodiment of the present disclosure is mounted, and shows an inflated and deployed state of the side airbag.

Hereinafter, a side airbag device for a vehicle and a side airbag folding method according to an embodiment of the present disclosure will be described using FIG. 1 through FIG. 5C. Note that an arrow FR, an arrow UP, and an arrow OUT that are shown where appropriate in the drawings respectively indicate a forward direction (i.e., a direction of travel) of a vehicle, an upward direction, and an outer side in a vehicle transverse direction. Hereinafter, unless specifically stated otherwise, if simple front-rear, left-right, or up-down directions are used, then these refer respectively to the front-rear direction of the vehicle, the left-right direction of the vehicle (i.e., the vehicle transverse direction), and the up-down direction of the vehicle. Moreover, in the following description, an outer side in the vehicle transverse direction is referred to as the 'vehicle outer side', while an inner side in the vehicle transverse direction is referred to as the 'vehicle inner side'.

(Overall Structure)

Prior to principal elements of the present embodiment being described, firstly, the an outline of the overall structure of a side airbag device for a vehicle 10 according to the present embodiment will be described. As is shown in FIG. 1, a side airbag device for a vehicle 10 is mounted on a side support portion 14A (referred to below simply as a 'side portion 14A') that is located on a vehicle outer side of a seat back 14 of a vehicle seat 12. The seat back 14 is connected to a rear end portion of a seat cushion 16 such that it is able to tilt back and forth, and a headrest 18 is connected to a top end portion of the seat back 14. This vehicle seat 12 represents, for example, the driver's seat of a left-hand drive vehicle.

The front-rear direction, the left-right direction, and the up-down direction of this vehicle seat 12 match the front-rear direction, the left-right direction (i.e., the transverse direction), and the up-down direction of the vehicle. In FIG. 1, instead of an actual driver, an impact test dummy P1 is seated in the vehicle seat 12. This dummy P1 may be, for example, a World SID (Internationally integrated side impact dummy: World Side Impact Dummy) AM50 (i.e., the 50th percentile of American adult males). Hereinafter, in order to simplify the explanation, the dummy P1 will be referred to as a 'seated occupant P1'.

Figure 2:
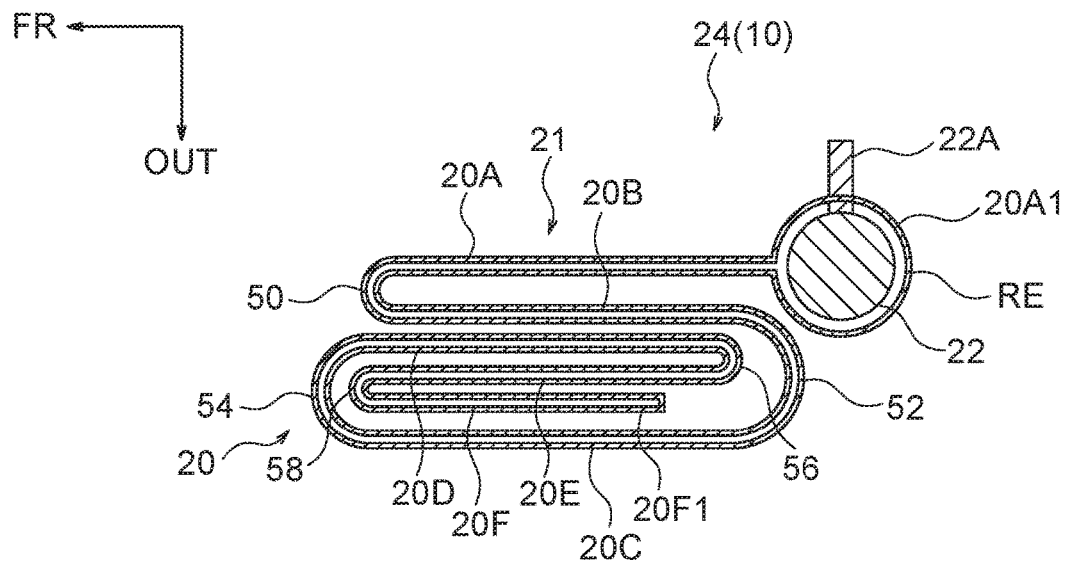
FIG. 2 is a planar cross-sectional view showing an enlargement of a folded state of a side airbag.

As is shown in FIG. 1, the side airbag device 10 is provided with a side airbag 20 and an inflator 22. Normally, as is shown in FIG. 2, the side airbag 20 and the inflator 22 are combined as an airbag module 24, and are housed inside the side portion 14A. In this airbag module 24, the side airbag 20 is folded based on the side airbag folding method according to the present disclosure. This side airbag 20 folding structure and the aforementioned folding method will be described in detail below.

Figure 5A:
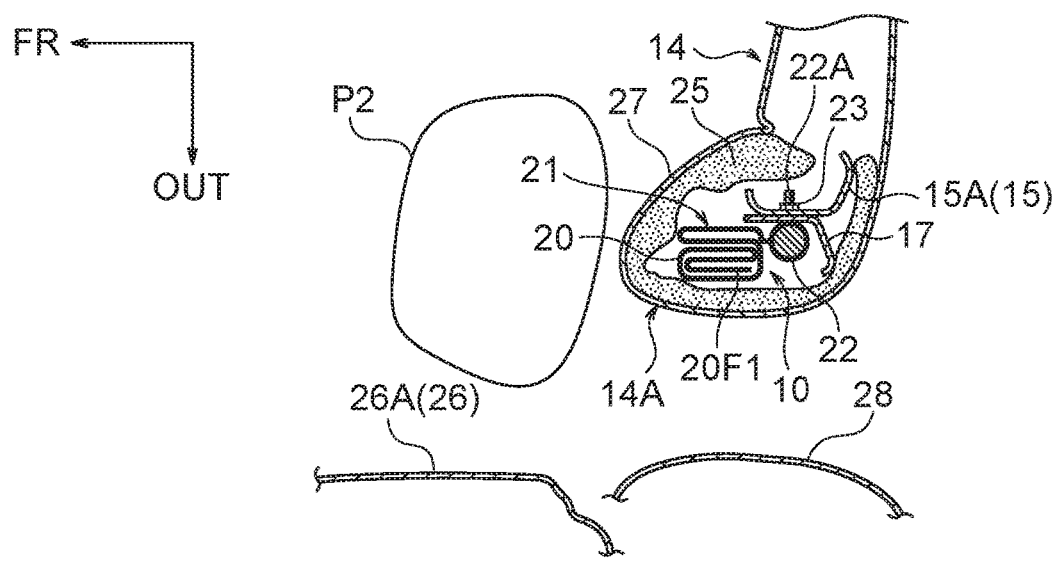
FIG. 5A is a planar cross-sectional view schematically showing the structure of a peripheral area including a side portion on an outer side in the vehicle transverse direction of the seat back shown in FIG. 1, and shows a state prior to the deployment of a side airbag of a side airbag device for a vehicle according to an embodiment of the present disclosure.
Figure 5B:
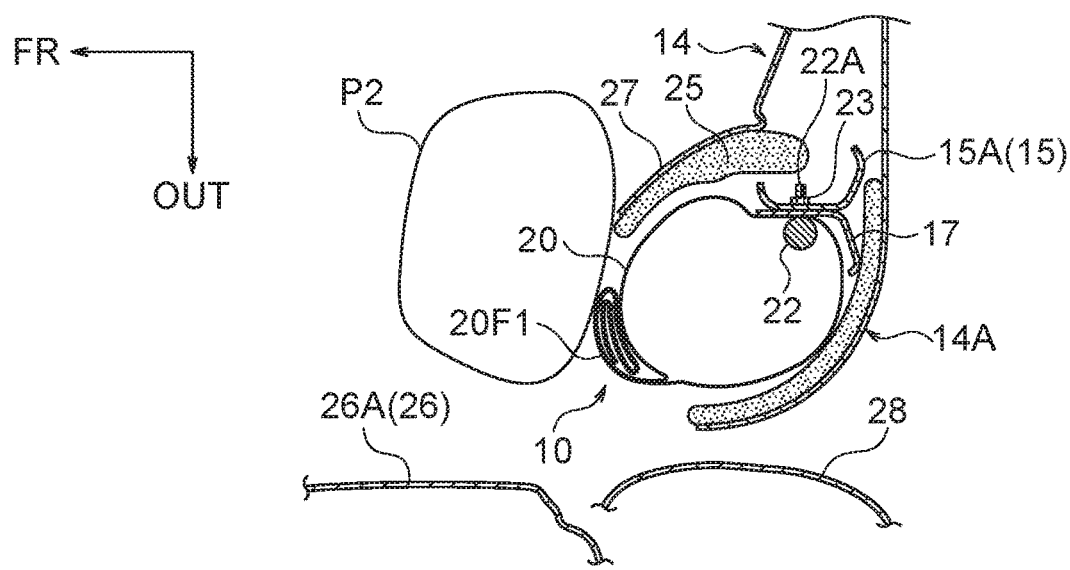
FIG. 5B is a planar cross-sectional view corresponding to FIG. 5A showing an initial deployment state of a side airbag according to an embodiment of the present disclosure.
Figure 5C:
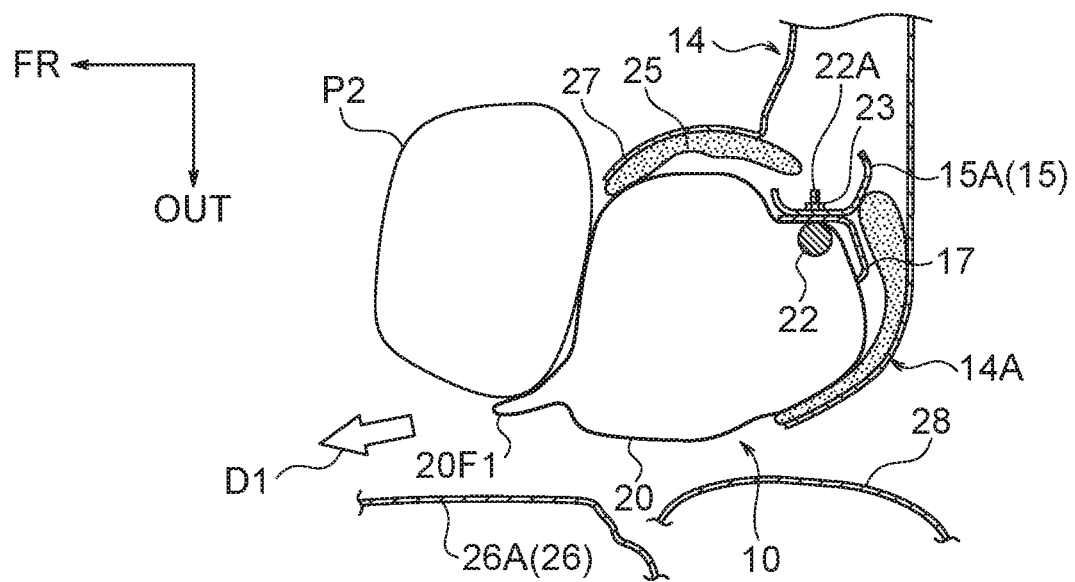
FIG. 5C is a planar cross-sectional view corresponding to FIGS. 5A and 5B showing a final deployment state of a side airbag according to an embodiment of the present disclosure.

This side airbag 20 is inflated and deployed between the seated occupant P1 and a vehicle body side portion (here, a door trim 26A of a front side door 26 and a B pillar garnish 28 that are shown in FIGS. 5A through 5C) by pressure from gas generated by the inflator 22. A structure is employed in which, during this inflation and deployment, as is shown in FIGS. 5B and 5C, padding material 25 and seat upholstery 27 that are disposed in the side portion 14A receive the inflation pressure from the side airbag 20 and are ruptured. Additionally, in this structure, during this inflation and deployment a reaction force plate 17 that is fixed to a side frame portion 15A of a seat back frame 15 imparts deployment reaction force towards the vehicle front side against the side airbag 20.

Note that the front-rear and up-down directions used in the following description in relation to the side airbag 20 indicate directions relating to the actual side airbag 20 component itself, and substantially coincide with the front-rear and up-down directions of the seat back 14 when the side airbag 20 is in an inflated and deployed state.

The above-described side airbag 20 may be formed in a bag shape, for example, by folding in two a single sheet of fabric that is formed by cutting a nylon-based or polyester-based fabric, and then sewing together outer peripheral edge portions thereof. Here, the side airbag 20 is what is known as a 3-chamber side airbag which is partitioned into a front chamber 34, a rear chamber 36 and a bottom chamber 38 by a top-bottom partition portion 30 and a front-rear partition portion 32 (omitted from the drawings except for FIG. 1 and FIG. 4A). The up-down partition portion 30 and the front-rear partition portion 32 are formed either by tethers (i.e., partition walls) that are attached to the inside of the side airbag 20, or by seams where the fabric forming the side airbag 20 is sewn together. The front chamber 34 and the rear chamber 36 are in mutual communication with each other via a communicating port 40 (i.e., an inner vent hole) that is formed in the front-rear partition portion 32.

Note that the method used to manufacture the side airbag 20 is not limited to that described above, and the method may be altered where this is appropriate. For example, it is also possible to employ a structure in which the side airbag 20 is formed by placing two sheets of fabric on top of each other and then sewing together outer peripheral edge portions thereof. Moreover, the number of chambers in the side airbag 20 is not limited to three, and this number may also be altered where appropriate.

When the above-described side airbag 20 is viewed in an inflated and deployed state from the side, it is seen to be formed in a substantially elliptical shape that is elongated in the up-down direction of the seat back 14. The size of this side airbag 20 is set to a size whereby it is able to restrain (i.e., protect) a shoulder portion S, a chest portion C, an abdominal portion B, and a waist portion L of the seated occupant P1. When this side airbag 20 is in an inflated and deployed state, the front chamber 34 and the rear chamber 36 are next to each other in the vehicle front-rear direction, and the bottom chamber 38 is located underneath the front chamber 34 and the rear chamber 36. As a result, the front chamber 34 restrains the front portions of the chest portion C and the abdominal portion B of the seated occupant P1, the rear chamber 36 restrains the shoulder portion S as well as the rear portions of the chest portion C and the abdominal portion B of the seated occupant P1, and the bottom chamber 38 restrains the waist portion L of the seated occupant P1.

The inflator 22 is housed in a rear end portion 20A1 of the side airbag 20 together with flow-regulating fabric 42 shown in FIG. 1 (and only shown in FIG. 1). This flow-regulating fabric 42 is a diffuser made from a fabric material, and is also sometimes known as a loop diffuser or an inner tube or the like. This flow-regulating fabric 42 is formed by cutting the same type of fabric as that used for the side airbag 20 into a rectangular shape, and then sewing this base fabric into a circular cylinder shape. The flow-regulating fabric 42 is positioned such that its vertical axis is aligned with the up-down direction of the seat back 14. A bottom portion of the flow-regulating fabric 42 penetrates a rear end portion of the up-down partition portion 30 so as to protrude into the bottom chamber 38.

The inflator 22 is what as known as a cylinder-type gas generating device, and is formed in a circular cylinder shape. This inflator 22 is housed inside the flow-regulating fabric 42 such that the longitudinal direction thereof is in parallel with the up-down direction of the seat back 14. A pair of top and bottom stud bolts 22A protrude towards the vehicle inner side from an outer circumferential portion of the inflator 22.

The top and bottom stud bolts 22A penetrate the base fabric of the side airbag 20, the flow-regulating fabric 42, the reaction force plate 17, and the side frame 15A of the set back frame 15, and nuts 23 (see FIGS. 5A to 5C) are screwed onto distal ends thereof. As a result, the inflator 22 is fastened (in what is known as a 'side-surface fastening') to the seat back frame 15 together with the side airbag 20, the flow-regulating cloth 42, and the reaction force plate 17. Note that it is also possible to employ a structure in which the stud bolts that protrude from the outer circumferential portion of the inflator 22 towards the vehicle inner side pass through a bracket that is fixed to the side frame 15A, and a nut is then screwed onto the distal end thereof (in what is known as a 'rear-surface fastening').

As is shown in FIG. 1, a side collision electrical control unit 46 (referred to below simply as a 'side collision ECU 46) that is mounted in the vehicle is electrically connected to the above-described inflator 22. A side impact sensor 48 that detects side impacts is electrically connected to the side collision ECU 46. In this structure, when the side collision ECU 46 detects a side impact based on a signal from the side impact sensor 48, it activates (i.e., operates) the inflator 22. Note that if a pre-crash sensor that predicts a side impact is electrically connected to the side collision ECU 46, then it is also possible to employ a structure in which the inflator 22 is activated when the side collision ECU 46 predicts a side impact based on a signal from this pre-crash sensor.

When the inflator 22 is activated, gas is injected from a gas injection portion provided either in a top end portion or a bottom end portion (the bottom end portion in this case) of the inflator 22. The injected gas is supplied via a bottom end aperture of the flow-regulating fabric 42 to the interior of the bottom chamber 38, and is supplied via a top end portion of the flow-regulating fabric 42 to the interior of the rear chamber 36. A portion of the gas that is supplied to the interior of the rear chamber 36 is supplied via the communicating port 40 to the interior of the front chamber 34. As a consequence, the side airbag 20 is inflated and deployed.

(Principal Elements of the Present Embodiment)

Next, the folding structure of the side airbag 20, and a side airbag folding method, which are the principal elements of the present embodiment, will be described.

[Folding Structure of the Side Airbag 20]

As is shown in FIG. 2 and FIG. 5A, in the side airbag 20 that is housed inside the side portion 14A, a folded portion 21 is housed in a folded state on the vehicle front side of a rear end RE of the side airbag 20. This folded portion 21 has a plurality of crease portions, namely, a first crease portion 50, a second crease portion 52, a third crease portion 54, a fourth crease portion 56, and a fifth crease portion 58. These crease portions 50, 52, 54, 56, and 58 extend in the up-down direction of the side airbag 20. In addition, in the folded portion 21, a first portion 20A, a second portion 20B, a third portion 20C, a fourth portion 20D, a fifth portion 20E, and a sixth portion 20F that are formed by folding the airbag 20 to the front or rear at the crease portions 50, 52, 54, 56, and 58 are superimposed on each other in the vehicle transverse direction (i.e., the seat transverse direction).

The first portion 20A, the second portion 20B, the third portion 20C, the fourth portion 20D, the fifth portion 20E, and the sixth portion 20F are arranged in their numerical sequence moving from the rear end portion 20A1 side of the side airbag 20 towards a front end portion 20F1 side thereof, and a rear end portion of the first portion 20A forms the rear end portion 20A1 of the side airbag 20. This first portion 20A extends as far as the vehicle forward side of the inflator 22. The first crease portion 50, which is the first crease portion counting from the rear end portion 20A1 side, is set between the first portion 20A and the second portion 20B. This first crease portion 50 is located at the front end side in the vehicle front-rear direction of the folded portion 21, and is an outward fold that is folded towards the vehicle outer side. The second portion 20B that extends towards the vehicle rear side from this first crease portion 50 is superimposed from the vehicle outer side on the first portion 20A.

The second crease portion 52, which is the second crease portion counting from the rear end portion 20A1 side, is set between the second portion 20B and the third portion 20C. This second crease portion 52 is located at the rear end side in the vehicle front-rear direction of the folded portion 21, and is an outward fold that is folded towards the vehicle outer side. The third portion 20C that extends towards the vehicle front side from this second crease portion 52 is superimposed from the vehicle outer side on the second portion 20B.

The third crease portion 54, which is the third crease portion counting from the rear end portion 20A1 side, is set between the third portion 20C and the fourth portion 20D. This third crease portion 54 is located at the vehicle front side (i.e., the front side in the vehicle front-rear direction) of the folded portion 21, and on the vehicle outer side of the first crease portion 50, and is an inward fold that is folded towards the vehicle inner side. This third crease portion 54 corresponds to the "first inward folding crease portion counting from the rear end portion of the side airbag", however, in the present embodiment, it is the "first and only" inward folding crease portion counting from the rear end portion 20A1 side of the side airbag 20. In the present embodiment, this third crease portion 54 is the third crease portion counting from the front end portion 20F1 of the side airbag 20, and the fourth crease portion 56 and the fifth crease portion 58 (i.e., two crease portions) are provided on the side airbag 20 front end portion 20F1 side of the third crease portion 54. The fourth portion 20D that extends towards the vehicle rear side from this third crease portion 54 is superimposed from the vehicle inner side on the third portion 20C, and from the vehicle outer side on the second portion 20B.

The fourth crease portion 56, which is the fourth crease portion counting from the rear end portion 20A1 side, is set between the fourth portion 20D and the fifth portion 20E. This fourth crease portion 56 is located at the rear end side in the vehicle front-rear direction of the folded portion 21, and is an outward fold that is folded towards the vehicle outer side. The fifth portion 20E that extends towards the vehicle front side from this fourth crease portion 56 is superimposed from the outer vehicle side on the fourth portion 20D, and from the vehicle inner side on the third portion 20C.

The fifth crease portion 58, which is the fifth crease portion counting from the rear end portion 20A1 side, is set between the fifth portion 20E and the sixth portion 20F. This fifth crease portion 58 is located on the front end side in the vehicle front-rear direction of the folded portion 21, and is an outward fold that is folded towards the vehicle outer side. The sixth portion 20F that extends towards the vehicle rear side from this fifth crease portion 58 is superimposed from the outer vehicle side on the fifth portion 20E, and from the vehicle inner side on the third portion 20C. The sixth portion 20F includes the front end portion 20F1 of the side airbag 20.

Figure 3:
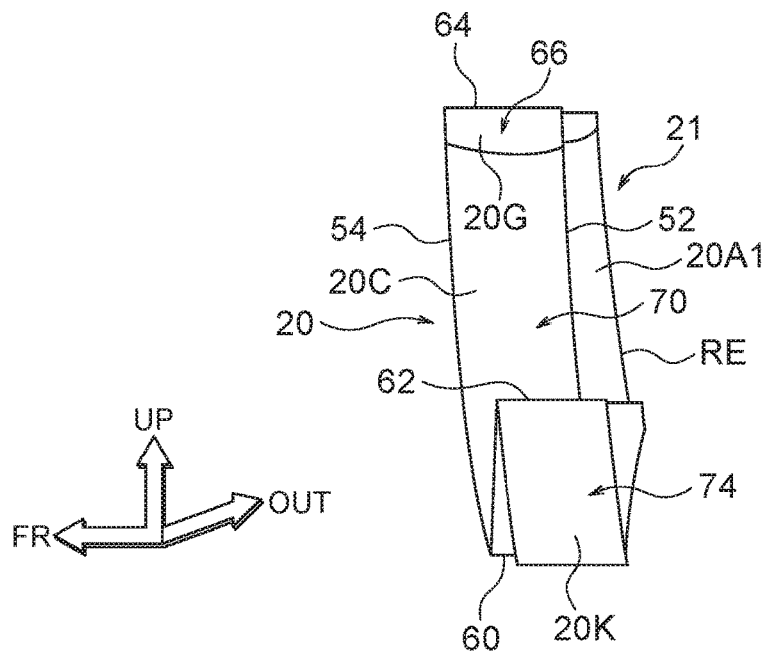
FIG. 3 is a perspective view showing a side airbag in a folded state.

Furthermore, in the present embodiment, as is shown in FIG. 3, a bottom portion side of the folded portion 21 is folded in a Z-fold towards the vehicle outer side at an upper and lower pair of bottom side crease portions 60 and 62 that extend in the front-rear direction of the seat back 14. Moreover, in the present embodiment, a top portion of the side airbag 20 is folded in two at an upper crease portion 64 that extends in the front-rear direction of the side airbag 20. This folding in two is performed by folding the top portion of the side airbag 20 towards the side that will become the vehicle outer side in an inflated and deployed state (i.e., in the state shown in FIG. 1) before the side airbag 20 is folded at the above-described respective crease portions 50, 52, 54, 56, and 58.

[Side Airbag Folding Method]

The above-described side airbag 20 is folded via a front two-folding step, a four-folding step, a rear two-folding step, and a superimposition step (described below). In the present embodiment, a top two-folding step that is performed prior to the front two-folding step, and a Z-folding step that is performed after the superimposition step are also set. Note that in the following description, the side of the side airbag 20 that is on the vehicle inner side in the inflated and deployed state is referred to as the 'one side in the thickness direction', while the side that is on the vehicle outer side in the inflated and deployed state is referred to as the 'other side in the thickness direction'.

Figure 4A:
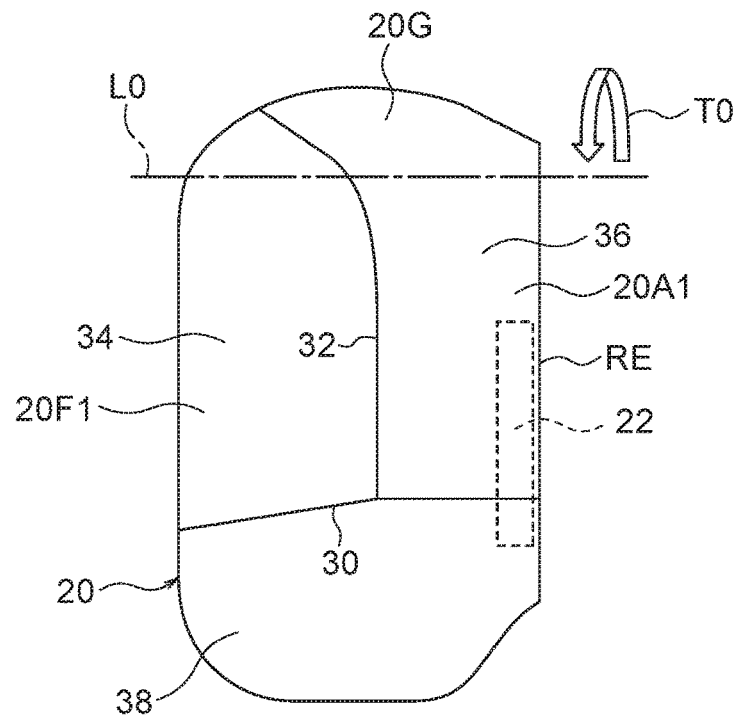
FIG. 4A is a side view showing a side airbag in a non-inflated and deployed state, and illustrates a top two-folding step of a side airbag folding method according to the present disclosure.
Figure 4B:
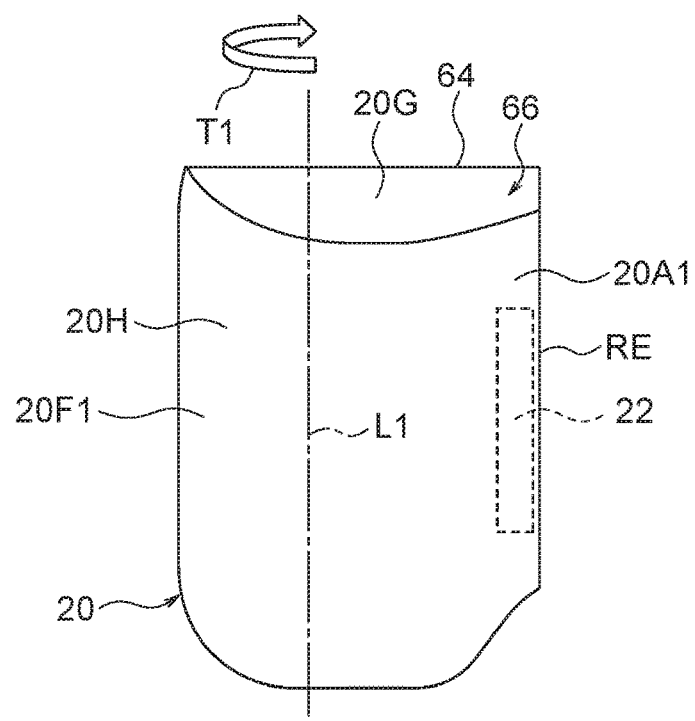
FIG. 4B is a side view of a side airbag after the top two-folding step, and illustrates a front two-folding step of the same folding method.

In the top two-folding step, as is shown in FIG. 4A, the side airbag 20 having the inflator 22 housed in the rear end portion 20A1 thereof is in a non-inflated and deployed state. A top portion 20G of the side airbag 20 is folded back (see an arrow T0 in FIG. 4A) towards the other side in the thickness direction of the side airbag 20 along an upper fold line L0 that extends in the front-rear direction of this side airbag 20. As a result, as is shown in FIG. 4B, a top two-fold portion 66 is formed, and the above-described upper crease portion 64 is also formed. The top portion 20G is the portion of the side airbag 20 that is on the top end side of the upper fold line L0.

Figure 4C:
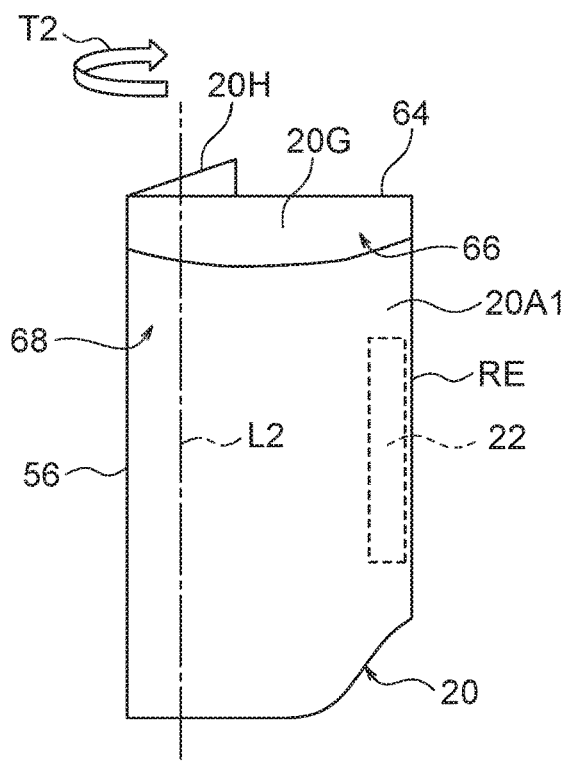
FIG. 4C is a side view of a side airbag after the front two-folding step, and illustrates a four-folding step of the same folding method.

Next, in the front two-folding step, as is shown in FIG. 4B, a front portion 20H of the side airbag 20 that is formed after the top two-folding step is folded back (see an arrow T1 in FIG. 4B) towards the one side in the thickness direction of the side airbag 20 along a first fold line L1 that extends in the up-down direction of the side airbag 20. As a result, as is shown in FIG. 4C, a front two-fold portion 68 is formed, and the above-described fourth crease portion 56 is also formed. Note that the front portion 20H is the portion of the side airbag 20 that is on the front end side of the first fold line L1, and is the portion that forms the above-described fifth portion 20E, sixth portion 20F, and fifth crease portion 58.

Figure 4D:
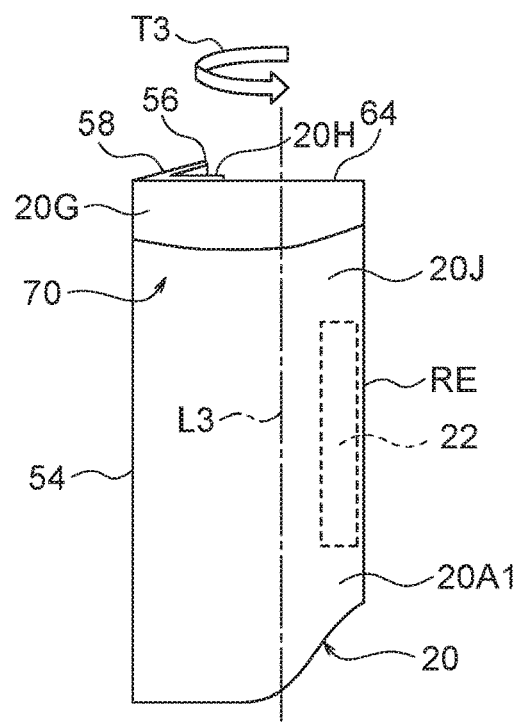
FIG. 4D is a side view of a side airbag after the four-folding step, and illustrates a rear two-folding step of the same folding method.

Next, in the four-folding step, as is shown in FIG. 4C, the above-described front two-fold portion 68 is folded in two (see an arrow T2 in FIG. 4C) along a second fold line L2 that extends in the up-down direction of the side airbag 20. In this case, the portion of the front two-fold portion 68 that runs parallel with the second fold line L2 is seen to be folded in a mountain fold when viewed from the other side in the thickness direction of the side airbag 20. As a result, as is shown in FIG. 4D, a wrapped four-fold portion 70 is formed, and the above-described third crease portion 54 and fifth crease portion 58 are also formed. The wrapped four-fold portion 70 is the portion that forms the above-described third portion 20C, fourth portion 20D, fifth portion 20E, sixth portion 20F, third crease portion 54, fourth crease portion 56, and fifth crease portion 58.

Figure 4E:
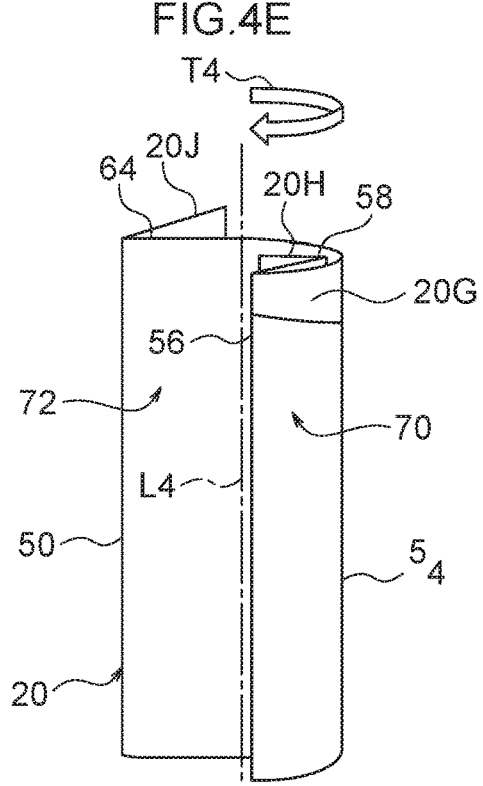
FIG. 4E is a side view of a side airbag after the rear two-folding step, and illustrates an overlaying step of the same folding method.

Next, in the rear two-folding step, as is shown in FIG. 4D, a rear portion 20J of the side airbag 20 that is formed after the four-folding step is folded back (see an arrow T3 in FIG. 4D) towards the other side in the thickness direction of the side airbag 20 along a third fold line L3 that extends in the up-down direction of the side airbag 20. As a result, as is shown in FIG. 4E, a rear two-fold portion 72 is formed, and the above-described first crease portion 50 is also formed. Note that the rear portion 20J is the portion of the side airbag 20 that is on the rear end side of the third fold line L3, and is the portion that forms the above-described first portion 20A.

Next, in the superimposition step, as is shown in FIG. 4E, the side airbag 20 that is formed after the rear two-folding step is folded in two along a fourth fold L4 that extends in the up-down direction of the side airbag 20. In this case, the portion of the side airbag 20 that runs parallel with the fourth fold line L4 is seen to be folded in a valley fold when viewed from the other side in the thickness direction of the side airbag 20. As a result, the wrapped four-fold portion 70 is superimposed (see an arrow T4 in FIG. 4E) onto the rear two-fold portion 72 on the opposite side from the rear portion 20J. As a result, as is shown in FIG. 4F, the above-described folded portion 21 and second crease portion 52 are formed.

Figure 4F:
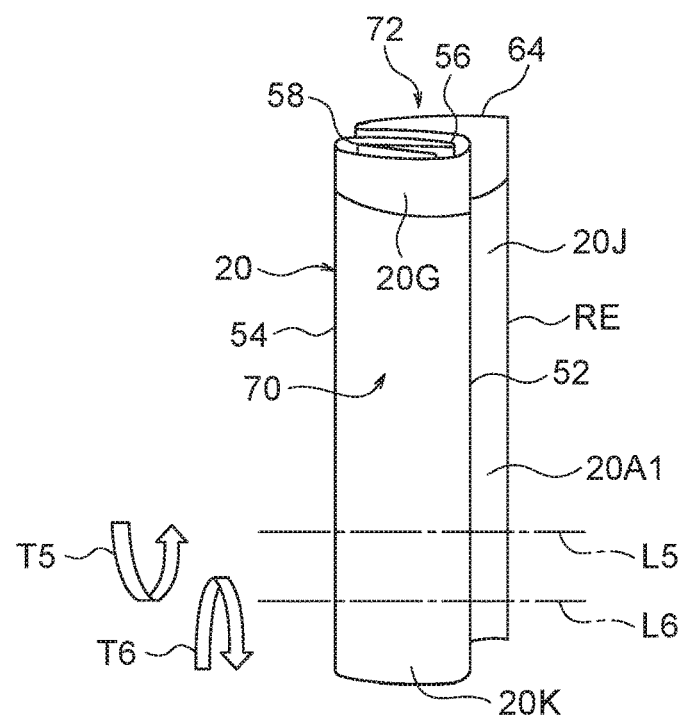
FIG. 4F is a side view of a side airbag after the overlaying step, and illustrates a Z-folding step of the same folding method.

Next, in the Z-folding step, as is shown in FIG. 4F, a bottom portion 20K of the side airbag 20 that is formed after the superimposition step is folded (see arrows T5 and T6 in FIG. 4F) in a Z-fold along an upper and lower pair of fold lines L5 and L6. In this case, the bottom portion 20K of the side airbag 20 is folded in this Z-fold to the one side (i.e., in FIG. 4F, the side closest to the viewer in a perpendicular direction relative to the drawing paper) while the wrapped four-fold portion 70 is located on that one side relative to the rear portion 20J. As a result, as is shown in FIG. 3, a Z-fold portion 74 is formed, and the above-described upper and lower pair of bottom side crease portions 60 and 62 are also formed.

(Operation and Effects)

Next, the operation and effects of the present embodiment will be described.

In the side airbag device for a vehicle 10 having the above-described structure, the side airbag 20 that is housed inside the side portion 14A of the seat back 14 in a folded state is inflated and deployed when it receives a gas supply from the inflator 22 that is housed in the rear end portion 20A1 of this side airbag 20. During this inflation and deployment, the folds formed in the first crease portion 50, the second crease portion 52, the third crease portion 54, the fourth crease portion 56, and the fifth crease portion 58 are eliminated in that sequence starting from the first crease portion 50 as the side airbag 20 is inflated and deployed sequentially from the rear end portion 20A1 side to the front end portion 20F1 side.

Here, the first crease portion 50 and the second crease portion 52 are outward folds that are folded towards the vehicle outer side. Because of this, in the initial stages of the deployment of the side airbag 20 when the folds formed at the first crease portion 50 and the second crease portion 52 are eliminated, the side airbag 20 deploys towards the vehicle outer side. As a result, as is shown in FIG. 5A, even if the side airbag 20 is inflated and deployed while a vehicle occupant P2 is located in an incorrect position on the vehicle forward side of the side portion 14A, it is possible to either prevent the vehicle occupant P2 who is in this incorrect position from receiving a load from the side airbag 20, or to limit any load that might be received.

The third crease portion 54 that is located on the vehicle outer side of the first crease portion 50 and on the vehicle front side of the folded portion 21 is an inward fold that is folded towards the vehicle inner side. Because of this, in the final stages of the deployment of the side airbag 20 when the fold formed in the third crease portion 54 is eliminated, the portion of the side airbag 20 that is located on the front end portion 20F1 side of the third crease portion 54 is deployed by spinning around the third crease portion 54 from the vehicle inner side to the vehicle outer side. As a result, it is possible to prevent the side airbag 20 in the final stages of deployment from becoming caught on vehicle body side portions (i.e., the door trim 26A and the like of the front side door 26), or to limit this if it does happen. Thereafter, the front end portion 20F1 side of the side airbag 20 is deployed towards the vehicle front side on the vehicle outer side of the vehicle occupant P2 who is in an incorrect position (see an arrow D1 in FIG. 5C). As a result of the above, according to the present embodiment, it is possible to make improvements to both the deployment performance and the OOP performance of the side airbag 20.

A supplementary description of above-described effects will now be given using a first comparative example 80 shown in FIGS. 6A through 6C, and a second comparative example 90 shown in FIGS. 7A through 7C. Note that structure in FIG. 6A through FIG. 7C that is the same as or similar to that of the present embodiment is given the same descriptive symbol as in the present embodiment.

Figure 6A:
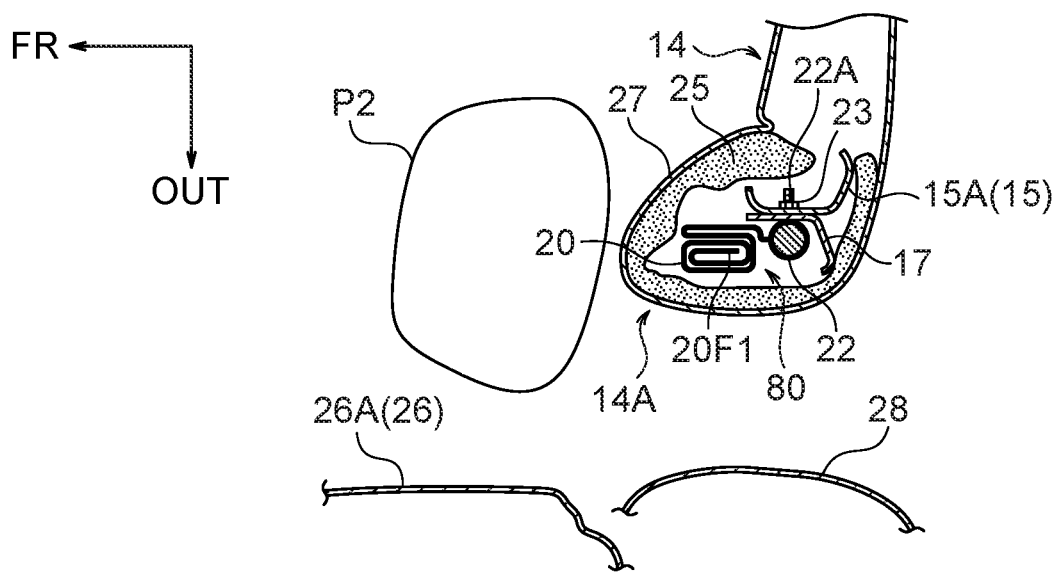
FIG. 6A is a planar cross-sectional view corresponding to FIG. 5A showing a state prior to the deployment of a side airbag according to a first comparative example.
Figure 6B:
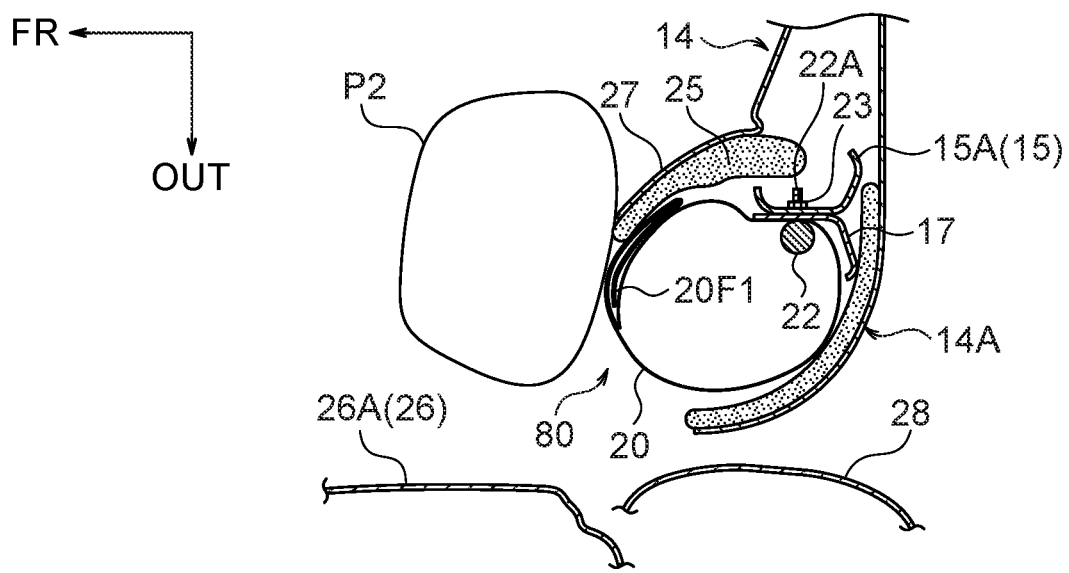
FIG. 6B is a planar cross-sectional view corresponding to FIG. 5B showing an initial deployment state of the side airbag according to the first comparative example.

In the same way as the side airbag device described in the Related Art paragraphs, in the first comparative example 80 shown in FIGS. 6A through 6C, a structure is employed in which the folded portion at the distal end (i.e., the front end and the upper end) in the deployment direction of the airbag 20 is folded back towards the vehicle inner side. Because of this, as is shown in FIGS. 6A through 6C, the folded portion on the front end portion 20F1 side is deployed from the vehicle inner side towards the vehicle outer side. As a result, it is possible to reduce the risk of the side airbag 20 becoming caught on the door trim 26A or the like. However, during the deployment of the folded portion on the front end portion 20F1 side from the vehicle inner side towards the vehicle outer side, the deployment direction of this folded portion on the front end portion 20F1 side faces towards the vehicle front side (see an arrow D2 in FIG. 6C). Because of this, there is a possibility that the vehicle occupant P2 who is in an incorrect position will receive a load from the folded portion on the front end portion 20F1 side.

Figure 7A:
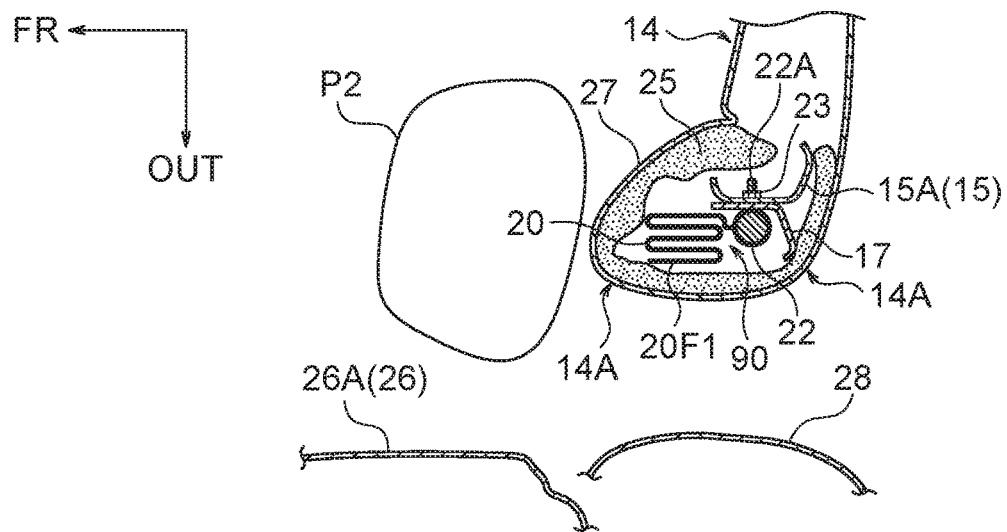
FIG. 7A is a planar cross-sectional view corresponding to FIG. 5A showing a state prior to the deployment of a side airbag according to a second comparative example.
Figure 7B:
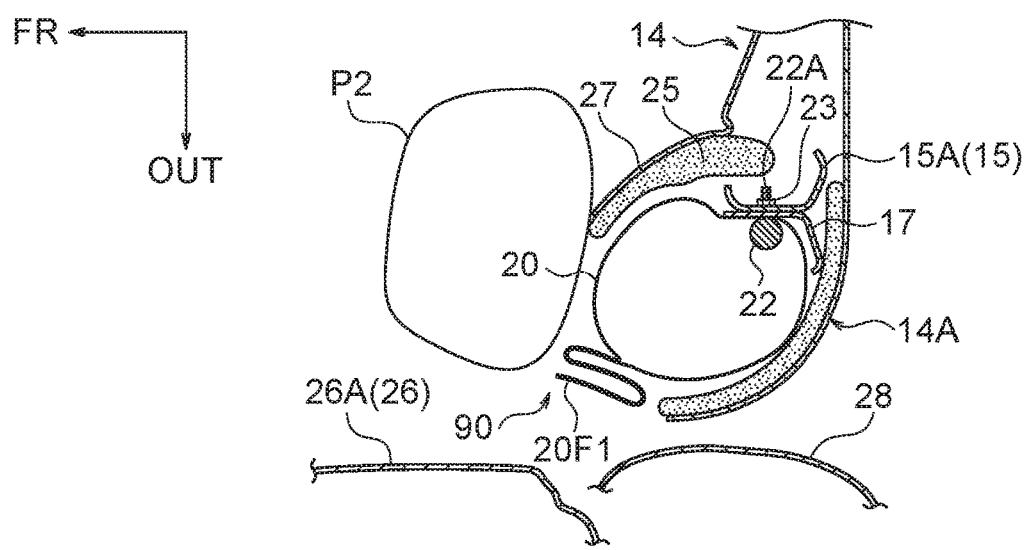
FIG. 7B is a planar cross-sectional view corresponding to FIG. 5B showing an initial deployment state of the side airbag according to the second comparative example.
Figure 7C:
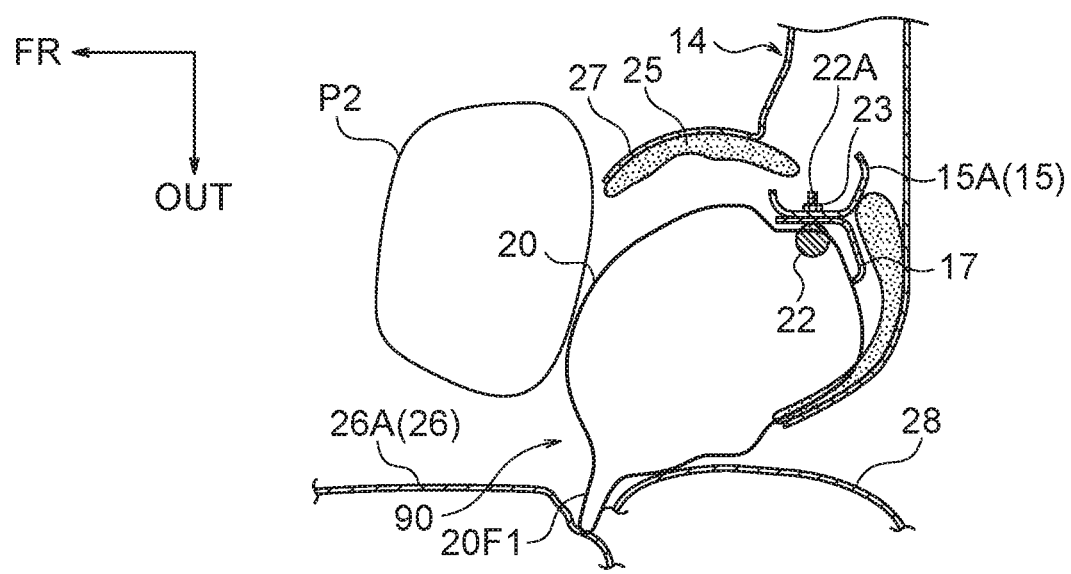
FIG. 7C is a planar cross-sectional view corresponding to FIG. 5C showing a final deployment state of the side airbag according to the second comparative example.

In contrast, in the second comparative example 90 shown in FIGS. 7A through 7C, the side airbag 20 is folded in an accordion fold from the vehicle inner side towards the vehicle outer side. Because of this, as is shown in FIGS. 7B and 7C, the side airbag 20 is deployed towards the vehicle outer side. As a result, it is possible to either prevent the vehicle occupant P2 who is in an incorrect position from receiving a load from the side airbag 20, or to limit any load that might be received. However, because the folded portion on the front end portion 20F1 side of the side airbag 20 is deployed towards the vehicle outer side, there is a possibility that this folded portion on the front end portion 20F1 side will become caught on the door trim 26A or the like, and that this will obstruct the smooth deployment of the side airbag 20.

In contrast to this, in the present embodiment, as is described above, the deployment direction of the side airbag 20 can be controlled by the outward folds at the first crease portion 50 and the second crease portion 52, and the inward fold at the third crease portion 54. As a result, not only can the side airbag 20 be prevented from becoming caught on the door trim 26A or the like, but the side airbag 20 can be deployed between the vehicle occupant P2 who is in an incorrect position and the door trim 26A.

Moreover, in the present embodiment, the side airbag 20 is able to restrain the area from the shoulder portion S to the waist portion L of the seated vehicle occupant P1 who is located in a proper position. In addition, the bottom portion of the side airbag 20 that is folded around the first crease portion 50 through the fifth crease portion 58 is also folded towards the vehicle outer side in a Z-fold at the upper and lower pair of bottom side crease portions 60 and 62. As a result, it is possible to shorten the dimensions in the up-down direction of the side airbag 20 when it is in a folded state. Moreover, because a Z-fold provides an excellent deployment performance, the bottom portion 20K of the side airbag 20 can be deployed superbly in the narrow space between the waist portion L of the seated vehicle occupant P1 and the vehicle body side portion.

In the same way, in the present embodiment, the top end portion of the side airbag 20 is folded in two by being folded at the upper crease portion 64 which extends in the front-rear direction of the side airbag 20. As a result, it is possible to shorten even further the dimensions in the up-down direction of the side airbag 20 when it is in a folded state.

In the present embodiment, because the folded side airbag 20 is manufactured by means of a side airbag folding method that has the above-described top two-folding step, front two-folding step, four-folding step, rear two-folding step, superimposition step, and Z-folding step, as is shown in FIG. 2 and the like, the folded side airbag 20 can be manufactured with ease.

[Supplementary Description of the Embodiment]

In the above-described embodiment, a structure is employed in which the bottom portion side of the folded portion 21 is folded towards the vehicle outer side in a Z-fold at the upper and lower pair of bottom side crease portions 60 and 62, however, the present disclosure is not limited to this. Namely, when, for example, the side airbag is a small sized airbag that only restrains from the chest portion to the abdominal portion of the vehicle occupant, then it is possible for the above-described Z-fold to be omitted.

Furthermore, in the above-described embodiment, a structure is employed in which the top portion of the side airbag 20 is folded in two before the side airbag 20 is folded over at the respective crease portions 50, 52, 54, 56, and 58, however, the present disclosure is not limited to this. Namely, it is also possible to employ a structure in which the top portion of the side airbag 20 is folded in two after the side airbag 20 has been folded over at the respective crease portions 50, 52, 54, 56, and 58. In addition, if the side airbag is a small sized airbag, then it is possible for the folding in two of the top portion of the side airbag 20 to be omitted.

Moreover, in the above-described embodiment, a case in which the rear two-folding step is performed after the four-folding step, however, the present disclosure is not limited to this and it is also possible to employ a structure in which the rear two-folding step is performed before the front two-folding step.

Furthermore, in the above-described embodiment, a structure is employed in which the folded portion 21 of the side airbag 20 has the first crease portion 52, the second crease portion 54, the third crease portion 54, the fourth crease portion 56, and the fifth crease portion 58, and the third crease portion 54 is an inward fold that is folded towards the vehicle inner side, while the other crease portions 50, 52, 56, and 58 are outward folds that are folded towards the vehicle outer side, however, the present disclosure is not limited to this. For example, it is also possible to employ a structure in which at least one out of the fourth crease portion 56 and the fifth crease portion 58 is an inward fold that is folded towards the vehicle inner side.

Figure 8:
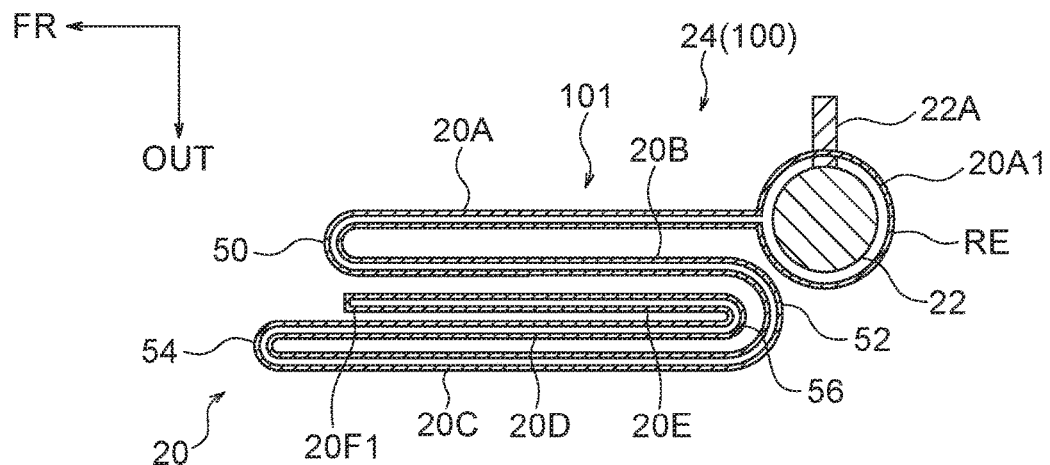
FIG. 8 is a planar cross-sectional view corresponding to FIG. 2 showing a folded state of a side airbag according to a first variant example of an embodiment of the present disclosure.

Moreover, in the above-described embodiment, a structure is employed in which the folded portion 21 of the side airbag 20 has the first portion 20A, the second portion 20B, the third portion 20C, the fourth portion 20D, the fifth portion 20E, and the sixth portion 20F which are the portions that are folded towards the front or rear at the respective crease portions 50, 52, 54, 56, and 58, however, the present disclosure is not limited to this. For example, as is the case in a side airbag device for a vehicle 100 (i.e., a first variant example) shown in FIG. 8, it is also possible to employ a structure in which a folded portion 101 is folded. In the folded portion 101, the sixth portion 20F and the fifth crease portion 58 have been omitted, while the fourth crease portion 56 is an inward fold that is folded towards the vehicle inner side. In addition, the fifth portion 20E includes the front end portion 20F1 of the side airbag 20. The rest of the structure in this side airbag device for a vehicle 100 is the same as in the above-described embodiment. Fundamentally, the same type of operation and effects as those obtained from the above-described embodiment are obtained from this side airbag device for a vehicle 100 as well.

Figure 9:
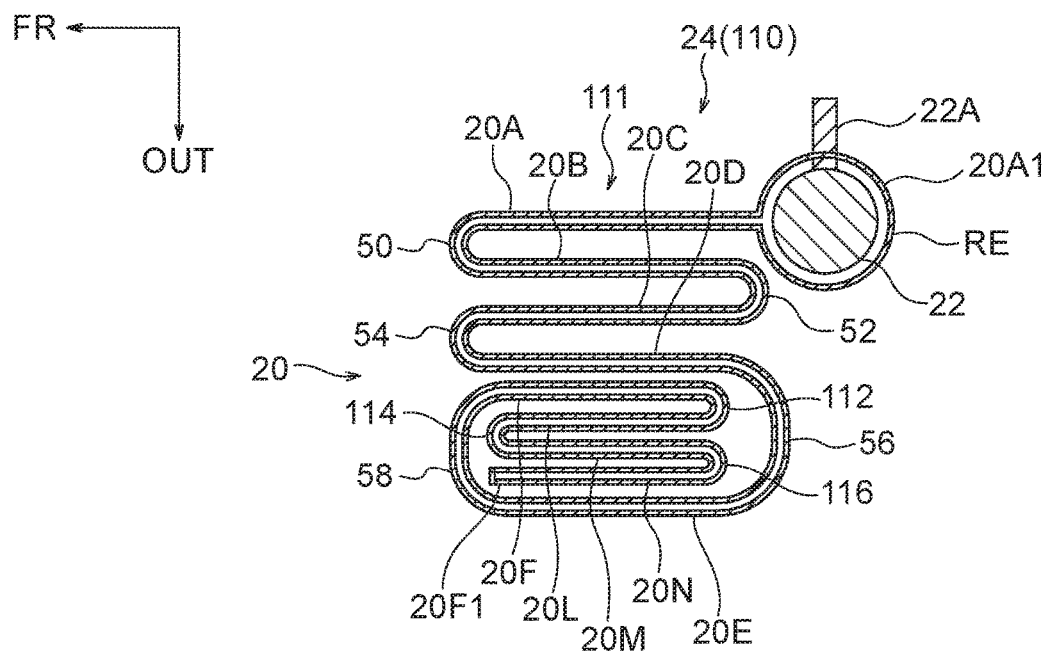
FIG. 9 is a planar cross-sectional view corresponding to FIG. 2 showing a folded state of a side airbag according to a second variant example of an embodiment of the present disclosure.

It is also possible, for example, to employ a structure in which, as is the case in a side airbag device for a vehicle 110 (i.e., a second variant example) shown in FIG. 9, it is also possible to employ a structure in which a folded portion 111 is folded. In this folded portion 111, in addition to the first crease portion 50, the second crease portion 52, the third crease portion 54, the fourth crease portion 56, and the fifth crease portion 58, there are provided a sixth crease portion 112, a seventh crease portion 114, and an eighth crease portion 116. The sixth crease portion 112, seventh crease portion 114, and eighth crease portion 116 extend in the up-down direction of the side airbag 20. In addition, in the folded portion 111, the first portion 20A, the second portion 20B, the third portion 20C, the fourth portion 20D, the fifth portion 20E, the sixth portion 20F, a seventh portion 20L, an eighth portion 20M, and a ninth portion 20N, which are the portions that are folded towards the front or rear at the respective crease portions 50, 52, 54, 56, 58, 112, 114, and 116, are superimposed on each other in the vehicle transverse direction (i.e., in the seat transverse direction). The ninth portion 20N includes the front end portion 20F1 of the side airbag 20.

Furthermore, in this folded portion 111, the first crease portion 50, the second crease portion 52, the third crease portion 54, the fourth crease portion 56, the sixth crease portion 112, the seventh crease portion 114, and the eighth crease portion 116 are outward folds towards the vehicle outer side, while the fifth crease portion 58 is an inward fold towards the vehicle inner side. This fifth crease portion 58 is the fifth crease portion counting from the rear end portion 20A1 side, and is the fourth crease portion counting from the front end portion 20F1 side. The fifth crease portion 58 corresponds to the "first inward folding crease portion counting from the rear end side of the side airbag" according to the present disclosure, and is located on the vehicle outer side of the first crease portion 50 and on the vehicle front side of the folded portion 111. The rest of the structure in this side airbag device for a vehicle 100 is the same as in the above-described embodiment. Fundamentally, the same type of operation and effects as those obtained from the above-described embodiment are obtained from this side airbag device for a vehicle 100 as well.

In addition to those described above, various other modifications may be made to the present disclosure insofar as they do not depart from the spirit or scope of the present disclosure. Furthermore, the scope of rights of the present disclosure is not to be considered as limited by the above-described embodiment.

What is claimed is:

1. A side airbag device for a vehicle, comprising:
a side airbag that is housed in a side portion on an outer side in a vehicle transverse direction of a seat back of a vehicle seat, that receives a gas supply from an inflator that is housed in a rear end portion of the side airbag, and that is then inflated and deployed between a seated vehicle occupant and a vehicle body side portion, wherein the side airbag includes:
a folded portion, of the side airbag that is housed in the side portion, that is located at a vehicle front side of a rear end of the side airbag, the folded portion having a plurality of crease portions that extend in a first direction, the first direction being an up-down direction of the side airbag when in a deployed state, and portions to the front and rear of the folds at the plurality of crease portions being superimposed in the vehicle transverse direction, and
a portion in which first and second crease portions, counting from a rear end portion side of the side airbag, are outwards folds that are folded towards the outer side in the vehicle transverse direction, and in which crease portions including and subsequent to a third crease portion, counting from the rear end portion side, that are also located at the vehicle front side of the folded portion, are inwards folds that are folded towards an inner side in the vehicle transverse direction, in which at least one crease portion is located further to a front end portion side of the side airbag than an initial inward folding crease portion counting from the rear end portion side, the initial inward folding crease portion being positioned on the outer side in the vehicle transverse direction of the first crease portion.

2. The side airbag device for a vehicle according to claim 1, wherein:
the side airbag is configured to restrain from a shoulder portion to a waist portion of the seated vehicle occupant, and
a bottom portion side of the folded portion is folded in a Z-fold towards the outer side in the vehicle transverse direction.

3. The side airbag device for a vehicle according to claim 1, wherein the folded portion has five crease portions, the third crease portion counting from the rear end portion side is an inward fold that is folded towards the inner side in the vehicle transverse direction, and crease portions other than the third crease portion are outward folds that are folded towards the outer side in the vehicle transverse direction.

4. The side airbag device for a vehicle according to claim 1, wherein the folded portion has a fourth crease portion, and the third and fourth crease portions counting from the rear end portion side are inward folds that are folded towards the inner side in the vehicle transverse direction.

5. The side airbag device for a vehicle according to claim 1, wherein the folded portion has eight crease portions, the fifth crease portion counting from the rear end portion side is an inward fold that is folded towards the inner side in the vehicle transverse direction, and crease portions other than the fifth crease portion are outward folds that are folded towards the outer side in the vehicle transverse direction.

* * * * *